United States Patent [19]

Miyakawa

[11] 4,385,854

[45] May 31, 1983

[54] COLLET CHUCK ASSEMBLY FOR TAPS

[75] Inventor: Eiji Miyakawa, Tokyo, Japan

[73] Assignee: Miyakawa Industry Co., Ltd., Seki, Japan

[21] Appl. No.: 173,407

[22] Filed: Jul. 29, 1980

[30] Foreign Application Priority Data

Aug. 21, 1979 [JP] Japan ................................ 54-106436
Aug. 24, 1979 [JP] Japan ................................ 54-108467

[51] Int. Cl.³ .......................... B23B 31/08; B23G 1/46
[52] U.S. Cl. ....................................... 408/127; 10/89 F; 279/1 Q; 279/1 S; 279/103; 279/16; 408/714
[58] Field of Search ............... 408/127, 239, 240, 714; 279/1 Q, 1 S, 1 SG, 1 E, 16, 102, 103; 10/89 F

[56] References Cited

U.S. PATENT DOCUMENTS

| | | | |
|---|---|---|---|
| 1,037,799 | 9/1912 | Schafer | 279/1 E |
| 2,484,027 | 10/1949 | Haffey | 279/16 |
| 2,785,903 | 3/1957 | Lassy | 279/1 S |
| 3,553,753 | 1/1971 | Hundley | 279/16 X |
| 4,152,091 | 5/1979 | Kucera | 279/1 S X |

OTHER PUBLICATIONS

Tool Holder Catalogue by N.T. Tool Kabushikikaisha (1975).

*Primary Examiner*—Z. R. Bilinsky
*Attorney, Agent, or Firm*—Armstrong, Nikaido, Marmelstein & Kubovcik

[57] ABSTRACT

A collet chuck assembly used for the attachment of a tap to the spindle of a tapping machine is provided. A bore for insertion of the base end of the tap is formed in the lower portion of a cylindrical portion, and at least one O-ring is mounted on the inner wall of the bore such that it is open to view on the inner peripheral face thereof. With the O-ring, the tap is held in place so as to prevent it from slipping down, and is supported somewhat floatingly within the bore in the diametrical direction. The cylindrical portion is provided therein with a pair of locking faces for locking the prismatic portion of the tap in place so as to inhibit any turning thereof and with a pair of steps or a set screw for controlling the amount of insertion of the tap thereinto.

10 Claims, 31 Drawing Figures

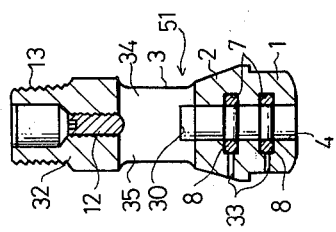
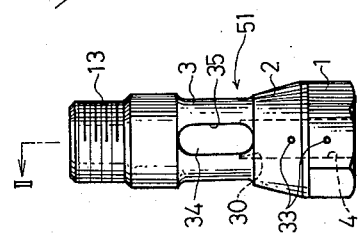
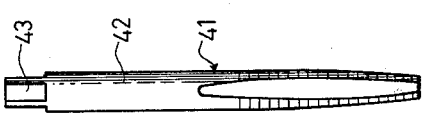
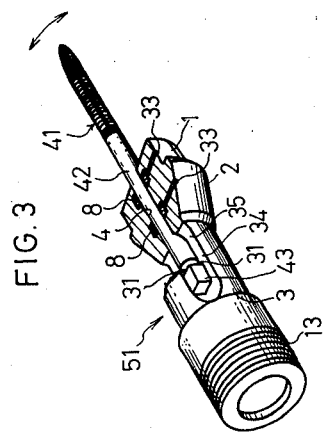
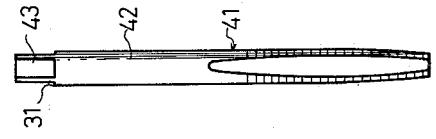

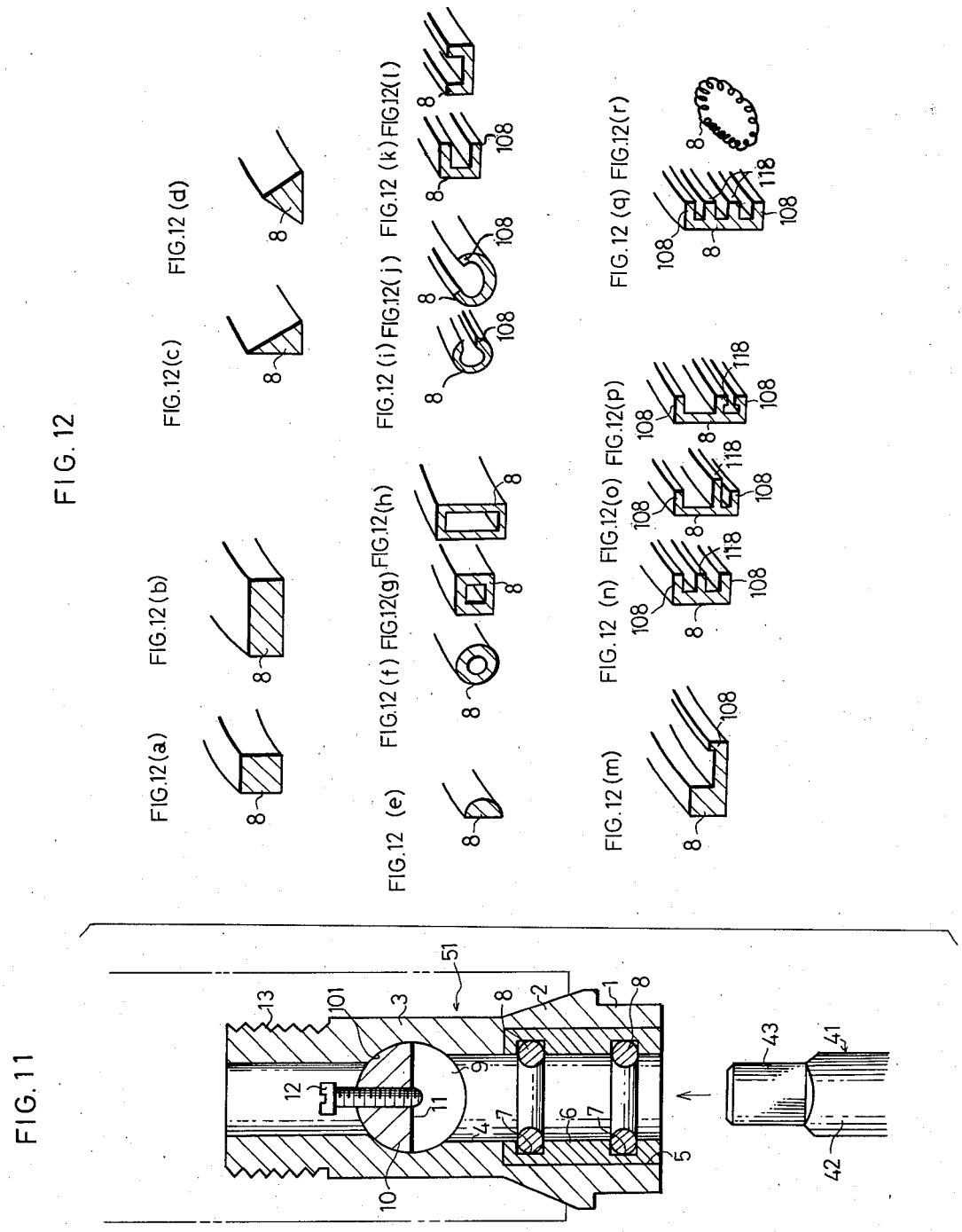

COLLET CHUCK ASSEMBLY FOR TAPS

FIELD OF THE INVENTION

The present invention generally relates to a collet chuck assembly for taps adapted to be used with a spindle of a tapping machine.

OBJECTS OF THE INVENTION

An object of the present invention is to provide a novel collet chuck assembly for taps, which is adapted to render mounting and demounting of the tap easy and to hold surely the tap in place without any accidental disengagement thereof.

Another object of the present invention is to provide an improved collet chuck assembly for taps, which is designed such that, when a plurality of taps are mounted on a tapping machine through a multiple spindle attachment, they are surely retained in place with their axial ends being aligned with each other by simple fine adjustment.

A further object of the present invention is to provide an improved collet chuck assembly for taps, in which the tap is retained in place such that, in tapping, it is supported floatingly in the diametrical direction to some extent.

A still further object of the present invention is to provide an improved collet chuck assembly for taps, in which the tap is retained in place such that, in tapping, it is supported floatingly in the diametrical direction to some extent, and that, upon tapping, it is surely returned to the original position.

A still further object of the present invention is to provide an improved collet chuck assembly for taps, which is designed such that mounting and demounting of an O-ring for supporting the tap is easily achieved.

Other objects of the present invention will now become obvious and apparent from an understanding of the detailed description of preferred embodiments and the appended claims. Numerical advantages not referred to herein will also become apparent to those skilled in the art by carrying out the present invention according to the teachings disclosed herein.

BRIEF DESCRIPTION OF THE DRAWINGS

FIG. 1 is a front view showing, together with a tap, a first embodiment of a collet chuck assembly for taps according to the present invention;

FIG. 2 is a sectional view taken on the line II—II of FIG. 1;

FIG. 3 is a partially cut-away perspective view showing the first embodiment provided with a tap;

FIG. 4 is a front view showing, together with a tap, a second embodiment of a collet chuck assembly for taps according to the present invention;

FIG. 11 is a sectional view of a collet chuck assembly the sleeve of which is provided at its end with O-rings; and FIGS. 12a through 12r are partial sectional views of further embodiments of an O-ring.

DETAILED DESCRIPTION OF THE PREFERRED EMBODIMENTS

Figure 6:
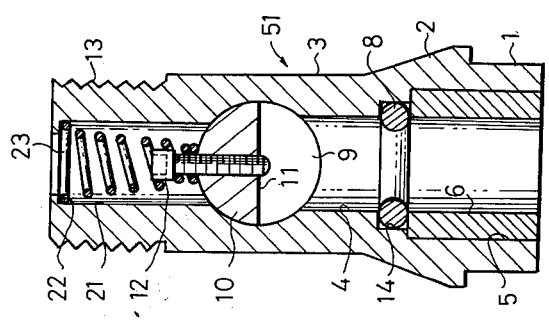
FIGS. 6 and 7 are sectional views of third and fourth embodiments of a collet chuck assembly, respectively.

Referring now to FIGS. 1 to 3, there is shown a first embodiment of the present invention, comprising a nut portion 1 located at the lower end of a collet chuck, a frusto-conical portion 2 formed thereon, and a shell or drum portion 3 extending from the portion 2. An opening or bore for inserting a tap therethrough, indicated by numeral 4, is formed in the central portions of the drum 3, the frusto-cone 2 and the nut 1, with its diameter being somewhat larger than a columnar portion 42 of a tap 41. It should be noted that the bore 4, drum 3, frusto-cone 2 and nut 1 form together a cylindrical body 51 of the collet chuck.

The tap-inserting bore 4 has upper and lower concave grooves 7, 7 formed in its inside periphery, each of said grooves receiving therein a rubber-made O-ring 8. Each O-ring 8 has an inside diameter somewhat smaller than the diameter of the columnar portion 42 of the tap 41 so that, upon insertion of the columnar portion 42, the ring abuts snugly against it and retains the tap 41 in place.

Pin holes 33, 33 each extending from a part of the groove 7 through the frusto-cone 2 and the nut 1 and being open on the outside peripheral face of the latter are used for inserting a pin to remove the O-ring 8.

The drum 3 of the collet chuck is provided therein with a longitudinal locking through-hole 34 in the diametrical direction, with its lower end being open in the upper end of the bore 4. In order to receive snugly the upper prismatic end 43 of the tap 41, the locking through-hole 34 has a width somewhat smaller than the diameter of the bore 4. Both inside faces of the through-hole 34 provide locking faces 35 for locking the upper prismatic end portion of the tap 41 in place such that its turning is inhibited.

A pair of steps 30 are provided between the locking faces 35 of the through-hole 34 and the tap-inserting bore 4, and are adapted to be in engagement with four steps 31 disposed between the columnar portion 42 and prismatic end portion 43 of the tap 41. The amount of insertion of the tap 41 through the collet chuck is controlled by engagement of both steps 30 and 31.

A member generally shown at 32 is provided for closing the top portion of the locking through-hole 34, into which a set screw 12 is threaded from above. The lower end of the set screw 12 is adapted to project in the top portion of the through-hole 34.

A threaded portion 13 is provided on the outside periphery of the upper end of the collet chuck drum 3, and is adapted to be threadedly inserted directly or through an arbor (not illustrated) into a spindle of a tapping machine. In order to effect such insertion, the nut 1 provided at the lower end of the collet chuck is turned by means of a wrench or the like to permit the frusto-cone 2 to be inserted into a tapered hole in the spindle or the lower end of the arbor.

Attachment of the tap 41 to the thus assembled collet chuck may be effected only by inserting the upper portion of the tap 41 into the through-hole 34 of the collet chuck from below. In the insertion, the prismatic end portion 43 of the tap 41 is inserted into the through-hole 34 of the collet chuck, while the steps 31 of the tap 41 are caused to engage the steps 30 of the tap-inserting bore 4. The upper end of the tap 41 is then spaced apart from the upper wall of the locking through-hole 34.

Insertion of the tap 41 into the collet chuck causes the cylindrical portion 42 to abut closely against the inside peripheries of the two O-rings 8 while enlarging forcedly them, thus preventing the tap 41 from slipping down. The tap 41 remaining inserted in the collet chuck can be subjected to floating movement in the direction of the locking through-hole 34 (i.e., the direction indicated by arrows in FIG. 3).

When the tap 41 suffers such floating movement, the prismatic end portion 43 thereof tilts along a pair of the locking faces 35 of the through-hole 34 of the collet chuck. This is because the prismatic end portion 43 remains inserted and retained in the locking through-hole 34 of the collet chuck, in addition to the fact that the columnar portion 42 of the tap 41 is somewhat smaller than the diameter of the tap-inserting bore 4.

With the foregoing tap 41, it is possible to effect reliable tapping even when a work has therein a drilled bore that is either off its axis or inclined more or less. This is because the tap 41 can be subjected to floating movement, and follow accurately the direction of such a drilled bore. In tapping, there is no fear that the tap 41 rotates relative to the collet chuck, since the prismatic end portion 43 thereof is held by the locking faces 35 of the collet chuck.

Upon the completion of tapping, removal of the tap from the collet chuck is easily achieved only by pulling down it against the elasticity of the two O-rings 8.

When the O-ring 8 is worn out, a pin is inserted through the pin hole 33 to force it into the tap-inserting bore 4, whereby the worn-out O-ring is easily removed.

While, in the foregoing embodiments, the amount of insertion of the tap 41 into the collet chuck is controlled by engagement of both steps 30 and 31 of the collet chuck and the tap 41, respectively, it will be understood that such control may be made by causing the lower end of the set screw 12 to abut against the upper end of the tap 41.

It will also be understood that the number of O-rings 8 for supporting the tap 41 may be one or three or more.

Figure 5B:
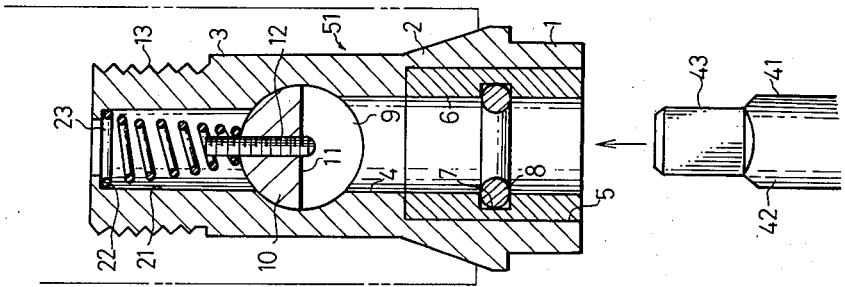
FIGS. 5a and 5b each are an enlarged sectional view of the collet chuck assembly of FIG. 4.
Figure 5A:
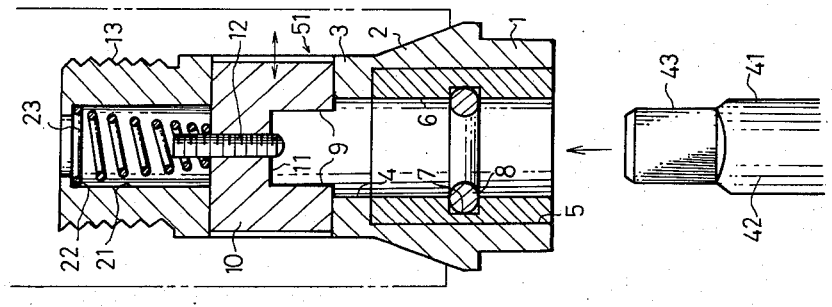

Referring to FIGS. 4 and 5, there is shown a second embodiment of the present invention, in which a movable member 10 is substituted for the steps 30 of the collet chuck and the member 32 for closing the top portion of the locking through-hole 34 so as to render it possible to permit a tap 41 to suffer floating movement in either diametrical direction thereof rather than in one direction.

A mounting portion 5 is recessed in the inside periphery of the tap-inserting bore 4 such that it is open downwards. A cylindrical sleeve 6 is fixedly fitted in the mounting recession 5 from below, with its inner wall lying on the same peripheral plane with that of a tap-inserting bore 4. A concave groove 7 is provided in the inside periphery of the sleeve 6, in which is fitted an O-ring 8.

A substantially columnar movable member shown generally at 10 is mounted in a lateral through-hole 101 formed in a drum 3 of a collet chuck, and is loosely fitted in the diametrical direction of the drum 3 such that it closes the upper end of the tap-inserting bore 4. The movable member 10 is also turnable relative to the collet chuck. The member 10 has a length somewhat smaller than the outer diameter of the drum 3, so that it is somewhat movable in the axial direction in a state where the collet chuck is threaded into a spindle.

A locking recession 11 is provided by cutting away the lower half portion of the member 10 in the direction perpendicular to its axial direction, with its insides serving in pairs as faces 9 for locking a prismatic end portion 43 of the tap 41 in place so as to prevent any turning thereof. A spacing between both locking faces 9 and 9 is such that the prismatic end portion 43 of the tap 41 is easily inserted therebetween from below.

A set screw 12 is threaded into the movable member 10 from above, with its lower end extending into the locking recession 11.

An opening 21 for receiving a return spring 23 is formed in the upper end portion of the collet chuck drum 3, and is kept open upwards through a step 22 formed on the inside periphery of the upper end portion. The return spring 23 received in the opening 21 is a coil spring with its winding diameter being greater at a higher position. At the lower end, the return spring 23 is wound around the outside periphery of the upper end portion of the screw 12 and is brought in resilient contact with the movable member 10 while, at the upper end, it is brought into resilient contact with the step 22.

Thus, whenever the member 10 turns or moves in the axial direction, it is restored to the original position by this return spring 23.

It will be understood that the return spring 23 is placed into the opening 21 in a contracted state by the operator's fingers.

In the thus assembled collet chuck, it is easy to form the groove 7 for attachment of the O-ring 8 and, hence, to attach the O-ring 8. In other words, the O-ring 8 is attached to the collet chuck through the sleeve 6, while the groove 7 is formed in the inside periphery of the sleeve 6. This embodiment makes the formation of the groove 7 easier in comparison with the first embodiment wherein similar grooves 7 are directly formed in the tap-inserting bore 4 of the collet chuck.

The sleeve 6 may be fitted and secured in the mounting recession 5 located at the lower end portion of the collet chuck upon the formation of the groove 7. Mounting of the O-ring 8 to the sleeve 6 may be carried out before or after the attachment of the sleeve to the collet chuck.

In order to attach the tap 41 to the collet chuck, the upper portion of the tap 41 may only be inserted into the tap-inserting bore 4 from below and through the sleeve 6. In the insertion, the prismatic end portion 43 of the tap 41 is retained in the locking recession 11, with its upper end contacting the lower end of the set screw 12. The upper end of the tap 41 is then spaced apart from the upper wall of the locking recession 11.

Insertion of the tap 41 into the sleeve 6 causes the prismatic end portion 43 of the tap 41 to abut closely against the inside periphery of the O-ring 8 while enlarging forcedly it, thus preventing the tap 41 from slipping down accidentally. The tap 41 can be subjected to floating movement in its either diametrical direction, since the prismatic end portion 43 of the tap 41 is retained in the locking recession 11 of the movable member 10, in addition to the fact that the cylindrical portion 42 of the tap 41 has a diameter slightly smaller than the inside diameters of the tap-inserting bore 4 and the sleeve 6.

More specifically, the upper end portion of the tap 41 is movable together with the movable member 10 in its axial direction (i.e., indicated by arrows in FIG. 5a) against the resiliency of the return spring. Moreover, the upper end portion is slidable in the direction normal to the axial direction of the movable member 10 while kept in contact with the set screw 12. Thus, the tap 41 can suffer floating movement in its either diametrical direction.

In some cases, the movable member 10 may turn slightly against the resiliency of the return spring 23 while the tap experiences floating movement.

It should be noted that, whenever the upper end of the tap 41 experiences floating movement, the overall tap 41 is also subjected to such movement in its diametrical direction while kept upright, since the lower portion of the tap 41 is resiliently supported in an upright state by the O-ring 8.

This has a great advantage that, in tapping, the tap 41 can follow a drilled bore with its axis being inclined or offset in a more improved manner.

Incorrect alignment of the tap 41 with respect to the drilled bore may be apt to take place especially when tapping is effected simultaneously with a plurality of drilled bores. The collet chuck assembly according to this embodiment is particularly suited for use in the case of such tapping that employ a multiplicity of spindles.

Tapping is also carried out using a pressed bore provided in a thin plate by barring in addition to the above-mentioned drilled bore. When a plurality of such pressed bores are prepared, however, there may be a great difference in the pitch. The collet chuck assembly according to the present invention is most advantageously used in the tapping of such pressed bores.

In tapping, there is no fear that the tap 41 is turned relative to the collet chuck since the prismatic end portion 43 thereof is retained by the locking faces 9 of the locking recession 11.

Upon the completion of tapping, the movable member 10 which has turned or moved in its axial direction according to the floating movement of the tap 41 is forcedly restored to the original position by this spring 23.

Removal of the tap 41 from the collet chuck may easily be accomplished only by pulling it against the resiliency of the O-rings 8.

There is also no possibility that the movable member 10 accidentally comes out of the collet chuck, since it receives threadedly the set screw 12. In addition, the amount of turning of the member 10 in the collet chuck is limited within a certain range, so that the locking recession 11 of the movable member 10 always faces downwards, thus making sure the insertion of the tap 41.

When carrying out simultaneously a plurality of tapping operations with a plurality of the taps 41, the respective taps 41 may differ in length from the outset, or may wear out or break. In this case, the lower ends of the taps 41 can be in alignment with each other by increasing or reducing the amount of the threaded insertion of the set screw 12.

Use may also be made of a sleeve having a rectangular shape in section.

Referring to FIG. 6, there is shown a third embodiment wherein a sleeve 6 has a length shorter than that of the sleeve 6 of the second embodiment, and is provided on its upper end with an O-ring 8.

A mounting recession generally shown at 14 is formed in the inside periphery of the tap-inserting bore 4 above the upper end of the sleeve 6, and has its inner diameter equal to the outer diameter of the O-ring 8. The width of the recession 14 is also equal to the thickness of the O-ring 8.

In order to attach the O-ring 8 to the cylindrical portion of the collet chuck in this embodiment, the O-ring 8 is first inserted into the recession 14 from the side of a nut portion 1 of the collet chuck. The attachment of the O-ring 8 is easily achieved since the diameter of the recession 14 is identical with the outer diameter of the O-ring 8. Upon the fitting of the O-ring 8, the sleeve 6 is fixedly inserted into a mounting recession 5.

Insertion of the sleeve 6 causes the O-ring 8 to be firmly held between the upper wall of the recession 14 and the upper face of the sleeve 6 without incidental disengagement of the O-ring 8.

The third embodiment has a further advantage that the mounting recession 14 is easily machined by a cutting tool inserted straight from the nut portion 1 of the collet chuck.

Figure 7:
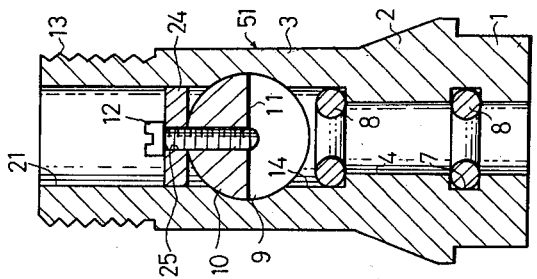

Referring to FIG. 7, there is illustrated a fourth embodiment wherein a mounting recession similar to, but wider than that of the third embodiment is formed in the inside periphery of a tap-inserting bore 4 of the collet chuck with its outer end being open at the lower end of the collet chuck. Two O-rings 8 are mounted on the interior of the recession 14 at a slight spacing. Upper and lower sleeves 6 are fixed between both O-rings 8 and between the lower O-ring 8 and the lower portion of the recession, respectively. Both sleeves 6 have a thickness smaller than that of the sleeves 6 of the second and third embodiments.

In order to attach the O-rings 8 and 8 to the collet chuck in this embodiment, the upper sleeve 6 is first fitted into the recession 14 in a state where the upper ring has been inserted therein, and the lower sleeve 6 is then fitted into the recession in a state where the lower ring has been inserted therein. In an assembled state, the upper O-ring 8 is held between the upper wall of the mounting recession 14 and the upper end face of the upper sleeve 6, an the lower O-ring 8 is done between both end faces of the upper and lower sleeves 6.

According to this embodiment, there is no need for the formation of the recessed groove 7, so that the recession 14 is easily provided by cutting the interior of the collet chuck from below.

Figure 8:
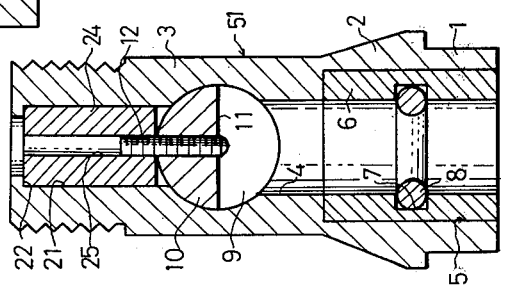
FIGS. 8 and 9 are sectional views showing a collet chuck assembly for taps with a return member but without a sleeve.

Even in the case of a collet chuck provided with the movable member 10 and the return spring 23 as used in the second to fourth embodiments, provision is not necessarily made of the sleeve 6. As will be understood from FIG. 8, the concave groove for mounting of the O-ring 8 may be formed directly in the inner wall of the tap-inserting bore 4 of the collet chuck in place of the provision of the sleeve 6.

Figure 9:
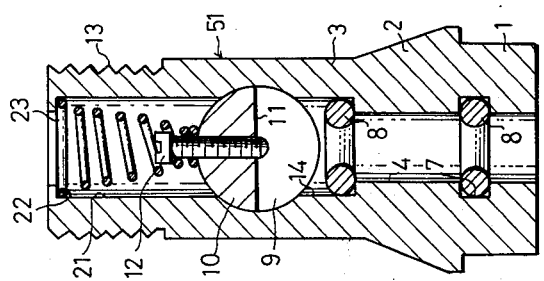

When the sleeve 6 is omitted, the attachment of the O-rings 8 will be rendered easy by forming the concave groove 7 in the inside periphery of the lower end portion of the tap-inserting bore 4 and forming the mounting recession 14 in the inside periphery of the tap-inserting bore 4 just below the movable member 10 such that it is open towards, as will be understood from FIG. 9.

In that case, the concave groove 7 and the mounting recession 14 can easily be machined by cutting tools inserted from below and above the collet chuck, respectively. In addition, the upper and lower O-rings 8 and 8 can easily be fitted into the recession 14 from above and into the groove 7 from below, respectively. It should be noted that mounting of the movable member 10 is effected after fitting of the upper O-rings 8.

The upper ring 8 has the movable member 10 located just above so that, when the tap 41 is inserted from below, there is no possibility that it slips off upwards.

Figure 10A:
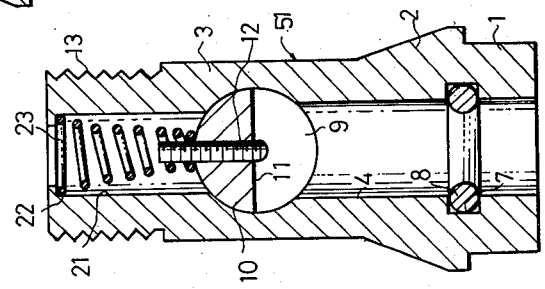
FIGS. 10a and 10b are sectional views showing further embodiments of a return member.
Figure 10B:
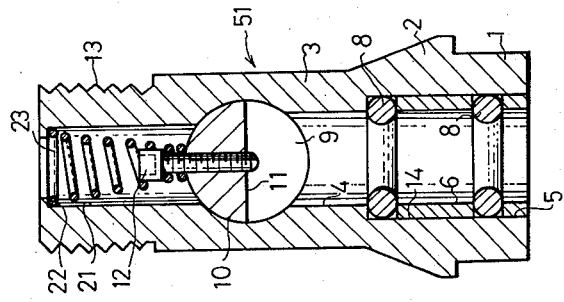

While all the foregoing embodiments employ the return spring 23 as a return member for the movable member 10, a resilient member formed of, e.g., soft synthetic resin or rubber may be substituted for this spring 23, as will be understood from FIGS. 10a and 10b.

In the embodiment of FIG. 10a, an opening 21 in the collet chuck is provided therein with a cylindrical resilient member 24 having a height equal to that of the opening 21 and an outer diameter equal to or slightly larger than the inner diameter thereof. The member 24 is further provided in its center with an opening 25 for snugly receiving a set screw 12. In the embodiment of FIG. 10b, one (or plural) resilient disc member 24 is in engagement with the head of the set screw 12.

In order to permit easy mounting of O-rings 8 with respect to the collet chuck, these O-rings 8 may be placed in concave grooves 7 formed in the ends of the sleeve 6, as shown in FIG. 11.

When the concave grooves 7 are formed in the inside periphery of a cylindrical body such as the sleeve 6 by means of a cutting tool, the nearer to the end of the cylindrical body the position of the grooves 7 to be formed, the easier it is to effect cutting operations. At a position far from the end, however, the cutting operations are difficult. In the embodiment of FIG. 2, the concave grooves 7 are easily formed by a cutting tool inserted through both ends of the sleeve 6, since they are designed to be located at both ends thereof. Upon the formation of the grooves 7, the sleeve 6 may then be fitted and secured in the mounting recession 5 positioned at the lower end of the collet chuck. Mounting of the O-rings 8 to the sleeve 6 may be carried out before or after the attachment of the sleeve 6 to the collet chuck.

While all the foregoing embodiments employ the O-ring 8 having a circular shape in section, use may be made of an O-ring taking on a variety of shapes, as shown in FIG. 12.

That is to say, FIGS. 12a and 12b show O-rings being rectangular in section; FIGS. 12c and 12d show O-rings being triangular in section; FIG. 12e shows an O-ring being semicircular in section; FIGS. 12f through 12h show O-rings having an annular configuration in section; FIGS. 12i and 12j show O-rings having a C-shaped configuration in section; FIGS. 12k and 12l illustrate O-rings having a channel-shaped configuration in section; FIG. 12m shows an O-ring having a L-shaped configuration in section; and FIGS. 12n through 12p illustrate O-rings having a E-shaped configuration in section.

Upon receiving the tap 41 from below, the inner peripheral edge 108 of each of the O-rings 8 as shown in FIGS. 12i, 12j, 12k and 12m is forcedly bent upwards, so that insertion of the tap 41 is made easier. When the tap 41 is pulled down for removal thereof, the inner edge 108 is drawn in the direction reverse to the bent direction thereof so that disengagement of the O-ring hardly takes place. Such an effect is particularly marked when a resilient flange 118 is further provided between the upper and lower peripheral edges 108 and 108, as shown in FIGS. 12n through 12p. Among others, it is preferred that the resilient flange 118 is located near to the lower edge 108, as shown in FIGS. 12o and 12p. This is because, upon receiving the tap 41, the resilient flange 118 is easily bent upwards and, upon removal thereof, the resilient flange 118 cooperates with the lower edge 108 so that it is not easily bent. In such an arrangement, the above-mentioned effect is further enhanced.

The O-ring 8 of FIG. 12q is obtained by adding another resilient flange 118 to the arrangement of FIG. 12n. The O-ring 8 of FIG. 12r, which is different slightly from the foregoing embodiments, is obtained by connecting both ends of a coil spring with each other into a ring.

All the O-rings 8 may be formed of rubber, resin, leather, metal and so on.

As will be understood from the foregoing explanation, the present invention has several advantages over the prior art; tapping is surely performed with an inclined bore since the tap is floatingly supported; and mounting and demounting of the tap is achieved in a very simple manner.

Obviously, a wide variety of different embodiments are provided without departing from the spirit and scope of the invention. Therefore, the present invention is only limited by the appended claims and is not restricted to such embodiments.

What is claimed is:

1. A collet chuck assembly for a tap, each tap including a base end, a prismatic portion adjacent to the base end and a columnar portion adjacent the prismatic portion, the columnar portion having a diameter; said collet chuck assembly comprising a cylindrical body having a nut portion, a frusto-conical portion, cylindrical portion, a center axis, opposite ends, a bore extending along said center axis from one end of said body through said nut portion, said frusto-conical portion and partially into said cylindrical portion, an opening extending along said center axis from the other end of said body to a point partially into said cylindrical portion, and a lateral through-hole extending perpendicular to said center axis through said cylindrical portion intercepting both said bore and said opening, said bore having an inner wall and a diameter larger than the diameter of the columnar portion of the tap; at least one O-ring having an inner diameter less than the diameter of the columnar portion of the tap and removeably mounted in said inner wall of said bore so that said inner diameter extends into said bore for floatingly supporting the columnar portion of an inserted tap in directions perpendicular to said center axis; a moveable member slideably inserted in said lateral through-hole and being moveable in the axial and rotational directions, said moveable member having a locking recession therein facing said bore defining a pair of locking faces adapted to locking hold the prismatic portion of the tap from rotation; and control means mounted in said moveable member for interacting with the base end of the tap to control a degree of insertion of the tap into the collet chuck assembly, said control means being a set screw having a point end threadingly inserted through said moveable member so that the point end abuts against a base end of an inserted tap.

2. The collet chuck assembly as recited in claim 1, wherein a pair of O-rings made of rubber are mounted in a pair of concave grooves 7 recessed in the inner wall of the bore 4.

3. The collet chuck assembly as recited in claim 1, wherein said bore 4 is provided in the inner wall with at least one mounting recession of said cylindrical body from said one end, and said assembly further includes at least one cylindrical sleeve fitted into said recession holding said at least one O-ring, said at least one sleeve having an inside periphery and two ends with faces.

4. The collet chuck assembly as recited in claim 3, wherein said at least one O-ring 8 is fitted into a concave groove 7 recessed in the inside periphery of the at least one sleeve 6.

5. The collet chuck assembly as recited in claim 4, wherein a pair of concave grooves 7 are provided in the inside peripheries of both ends of the at least one sleeve 6.

6. The collet chuck assembly as recited in claim 3, wherein said at least one O-ring 8 is retained in the mounting recession by the end face of the at least one sleeve 6.

7. The collet chuck assembly as recited in claim 3, wherein a pair of O-rings 8 are retained in the mounting recession by the end faces of a pair of sleeves 6.

8. The collet chuck assembly as recited in claim 1, wherein said set screw 12 has a base end extending into said opening 21 and said assembly further includes a return means positioned in said opening 21 for forcedly returning said moveable member 10 to an original position when said moveable member is moved in the axial or rotational direction.

9. The collet chuck assembly as recited in claim 8, wherein said return means is a coil spring 23 having a winding diameter greater at a position nearer to said other end of said body and a smaller end portion fixedly wound around said base end of the set screw 12.

10. The collet chuck assembly as recited in claim 8, wherein said return means is a resilient member 24 fitted into said opening 21 receiving therein the base end of the set screw 12.

* * * * *